US008249967B2

(12) United States Patent
Park et al.

(10) Patent No.: US 8,249,967 B2
(45) Date of Patent: Aug. 21, 2012

(54) IMAGE-BASED PAYMENT MEDIUM

(76) Inventors: David S. Park, Houston, TX (US); Sameer Mandke, Katy, TX (US)

( * ) Notice: Subject to any disclaimer, the term of this patent is extended or adjusted under 35 U.S.C. 154(b) by 631 days.

(21) Appl. No.: 12/352,598

(22) Filed: Jan. 12, 2009

(65) Prior Publication Data

US 2009/0182634 A1    Jul. 16, 2009

Related U.S. Application Data

(60) Provisional application No. 61/010,874, filed on Jan. 10, 2008.

(51) Int. Cl.
  *G06Q 40/00* (2012.01)
(52) U.S. Cl. .............................. 705/35; 705/14.1; 705/44
(58) Field of Classification Search ................. 705/14.1, 705/35, 44
  See application file for complete search history.

(56) References Cited

U.S. PATENT DOCUMENTS

| | | | |
|---|---|---|---|
| 7,630,926 B2* | 12/2009 | Chakiris et al. ................ | 705/35 |
| 2001/0051915 A1* | 12/2001 | Ueno et al. ...................... | 705/39 |
| 2002/0060246 A1* | 5/2002 | Gobburu et al. ......... | 235/462.46 |
| 2007/0244811 A1* | 10/2007 | Tumminaro .................... | 705/39 |
| 2008/0011825 A1* | 1/2008 | Giordano et al. ............ | 235/380 |
| 2008/0128505 A1* | 6/2008 | Challa et al. ............ | 235/462.13 |
| 2008/0149713 A1* | 6/2008 | Brundage ..................... | 235/435 |
| 2008/0269947 A1* | 10/2008 | Beane et al. ................... | 700/237 |
| 2009/0090783 A1* | 4/2009 | Killian et al. ................. | 235/492 |
| 2009/0094123 A1* | 4/2009 | Killian et al. ................... | 705/16 |
| 2009/0119190 A1* | 5/2009 | Realini ............. | 705/30 |
| 2009/0164421 A1* | 6/2009 | Pacella ............................. | 707/3 |
| 2009/0281891 A1* | 11/2009 | Walker et al. ............. | 705/14.38 |
| 2010/0275010 A1* | 10/2010 | Ghirardi ....................... | 713/155 |

* cited by examiner

*Primary Examiner* — Jagdish Patel
*Assistant Examiner* — Sara C Hamilton
(74) *Attorney, Agent, or Firm* — Robert F. Gilbert

(57) ABSTRACT

Disclosed is a method and system for use of an image-based payment medium through images stored on the consumer's mobile phone in place of traditional plastic gift, credit or debit cards. Upon authentication, an image is sent to the consumer's mobile phone. The consumer displays the image at the retailer's point of sale when completing a transaction. The image is scanned with a barcode reader, a webcam or other scanning device and the consumer's account in a database is debited or credited based on the amount and type of transaction. An image-base payment medium provides for the ability to target specific ads to the consumer, directed to the registered mobile phone number and also to attach loyalty and coupon programs to the account, which the recipient may redeem upon scanning of the encoded image on the mobile phone at the point of sale. The system and method is suitable for "virtual" gift cards, credit and debit cards, loyalty payment programs and other methods of value exchange.

3 Claims, 6 Drawing Sheets

IMAGE-BASED PAYMENT MEDIUM

CROSS REFERENCE TO RELATED APPLICATION

This application claims the benefit of co-pending U.S. Provisional Patent Application Ser. No. 61/010,874 entitled Method for Use of Payment Instruments through Mobile Phones, filed on Jan. 10, 2008, which is incorporated herein by reference.

STATEMENT REGARDING FEDERALLY SPONSORED RESEARCH OR DEVELOPMENT

Not Applicable.

BACKGROUND OF THE INVENTION

1. Field of the Invention

This application relates to an image-based payment medium for retail sales that employs images stored on mobile phones in place of traditional plastic gift cards or credit cards.

2. Description of the Related Art

Traditional plastic gift cards are prevalent in the retail industry. The gift card industry is a relatively new one when compared to other payment mediums such as credit or debit cards. But gift cards are quickly becoming a gift of choice among consumers for many reasons: convenience of the card, the personal touch a gift card can preserve, and the ability of the recipient to make the actual gift selection from the retailer. Gift cards as a phenomenon have also accompanied other innovations such as gift registries for weddings, the ultimate effect of which is to avoid the situation in which a gift giver gives a gift that the user does not like and will likely return.

There is little to no differentiation in the processing of gift cards among various providers. In fact, differentiation is perhaps the key factor in which various gift card providers may compete, but are currently not able to do so. The gift card is typically processed via either a magnetic stripe reader or barcode scanner, though hand written accounting for small retailers is not unheard of. These technologies are relatively well developed and well entrenched in the retail sector. Most retailers now have either a barcode scanner of some sort or a magnetic card reader. These devices simply translate the encoded data into a data string that uniquely identifies the gift card and is sent off electronically to a processor to validate the balance of the card, which is reconciled at purchase. Third party providers of gift card services tend to give the retailer specifications on data transmission, for both liability and cost reasons. Gift cards as a result are very limited in functionality, unable to serve more than one purpose or handle several strings of data that may be linked to several different functions. This is simply a limit of the traditional magnetic stripe and laser barcode technology.

Retailers employing an image-based payment medium for gift, credit or debit cards, however, have several options available to them, including text message notifications of balances and advertisements, and the ability to apply more credit to the recipient's account remotely. Also, whereas givers of traditional gift cards must carry the cards until they deliver them to their intended users, an image-based payment medium is delivered directly to the user's mobile phone so the donor never has to worry about handing the gift card to the user. Customizable delivery options would allow for personalized e-cards to be delivered with the image-based payment medium and an exact time of deliver that may be months in advance. An image-based payment medium offers a level of convenience and customer interaction unrealized by plastic gift cards.

SUMMARY OF THE INVENTION

One embodiment of the invention includes a method of using an encoded image that is sent to the recipient's mobile phone to be used much like a conventional plastic gift, credit or debit card. Once the recipient receives the image on the mobile phone, the recipient may present the image to a cashier at a participating retailer, and the cashier will scan the image off of the user's phone screen. The balance of the image-based payment medium is credited or debited appropriately for the transaction, just as is done currently with plastic cards. The method comprises (a) issuing an image-based payment medium either through a website or other means, designating a recipient of the image-based payment medium and the recipient's mobile phone number and establishing an account for the recipient; (b) sending an image to the recipient's mobile phone number; and (c) scanning the image from the recipient's mobile phone at a point of sale to validate and debit the recipient's account for purchases made by the recipient at the point of sale.

Another embodiment of the invention includes a computer-implemented system. The retail establishment or a third party provider could use a system that provides a database of information on the holders of accounts, applications to handle the purchase of an image-based payment medium by a donor, applications to authenticate the account and optionally request permission from the recipient to allow the retailer to send advertisements to the recipient's mobile phone, and point of sale applications to handle the crediting and debiting of accounts. The system comprises (a) a database which keeps data related to the image-based payment medium and the recipient of the image-based payment medium; (b) a web based user interface for selling and authenticating the image-based payment medium and for sending an image representing the image-based payment medium to the recipient's mobile phone; and (c) a point of sale system to scan the image of the image-based payment medium from a screen of the recipient's mobile phone, interfacing with the database to provide authentication of the image, and to provide debits and credits to the recipient's account.

BRIEF DESCRIPTION OF THE DRAWINGS

So that the manner in which the above recited features, advantages and objects of the present invention are attained and can be understood in detail, a more particular description of embodiments of the invention, briefly summarized above, may be had by reference to the embodiments which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS

Figure 1:
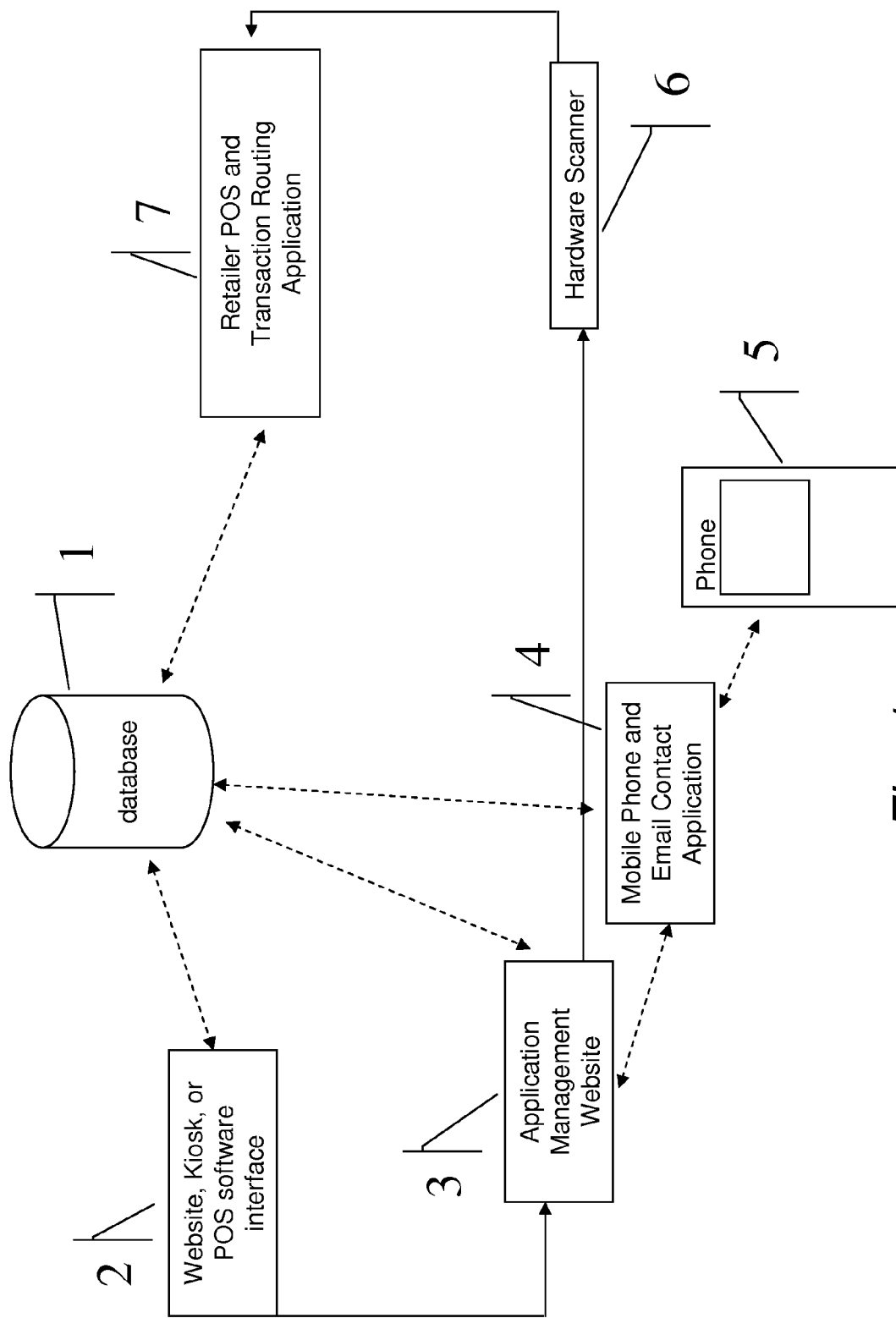
FIG. 1 is a System Overview showing one embodiment of this invention.
Figure 2:
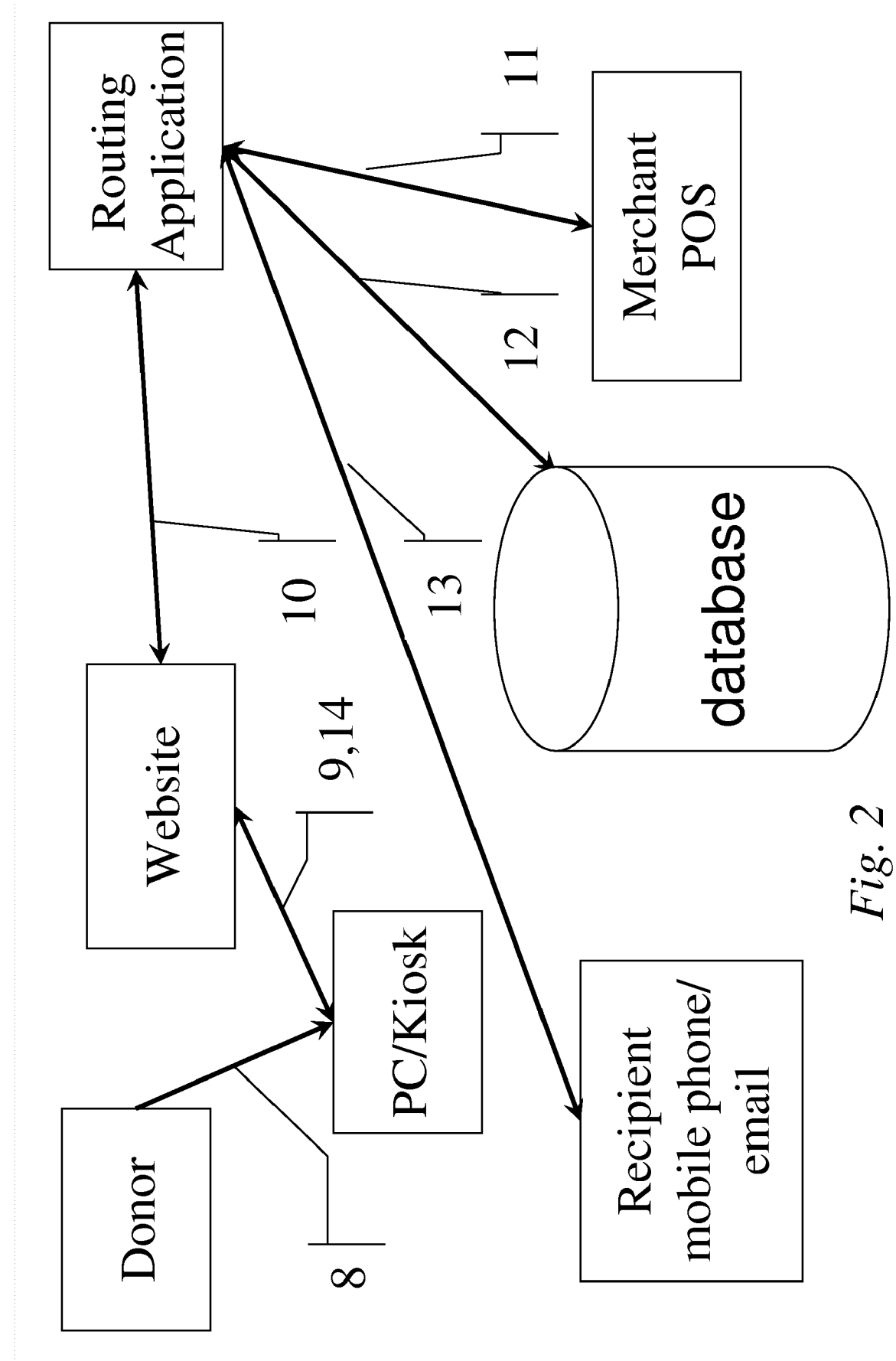
FIG. 2 illustrates a transaction flow of a typical issue transaction in one embodiment of this invention.
Figure 3:
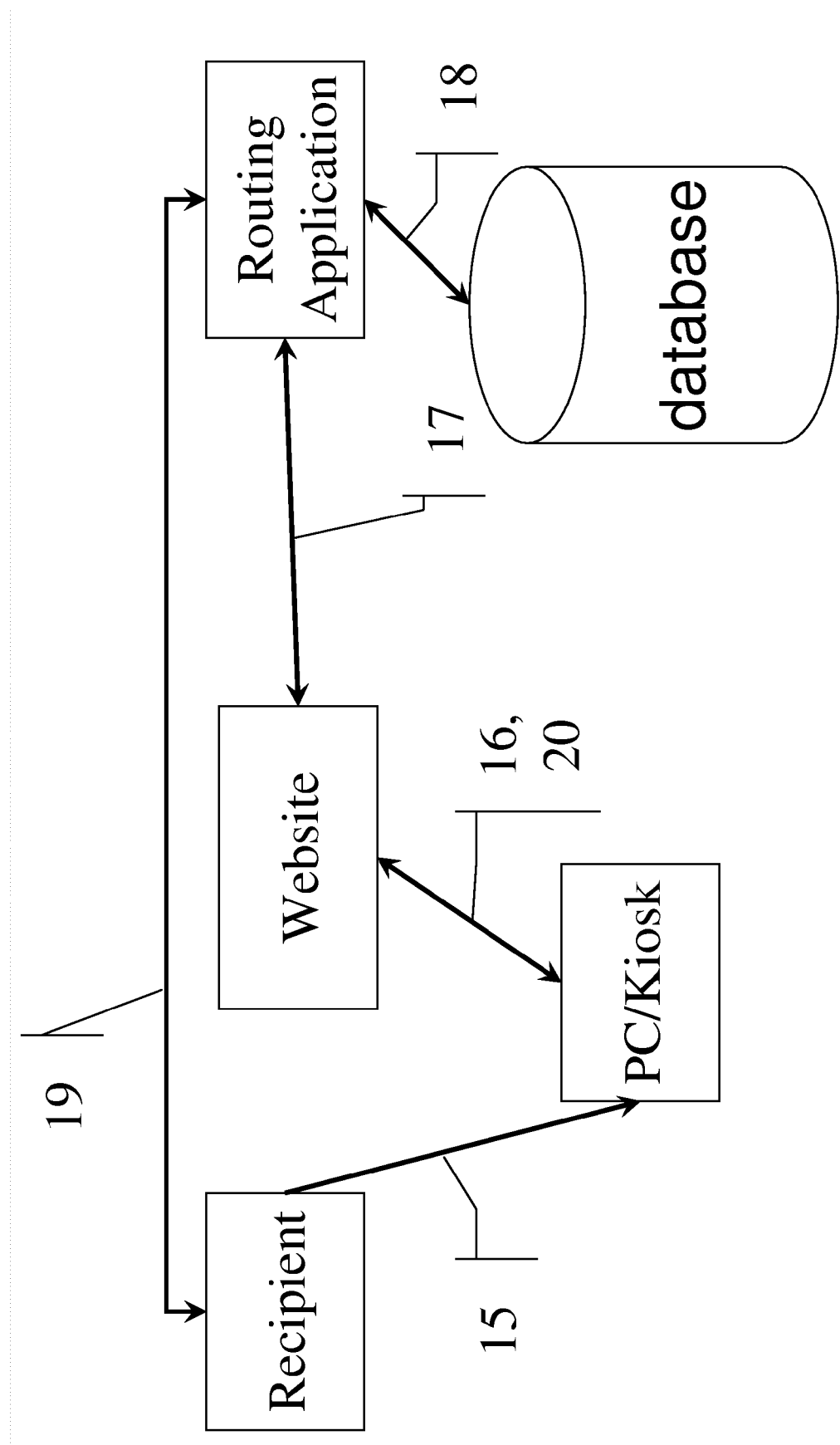
FIG. 3 illustrates a transaction flow of a typical activation of an image-based payment medium in one embodiment of this invention.
Figure 4:
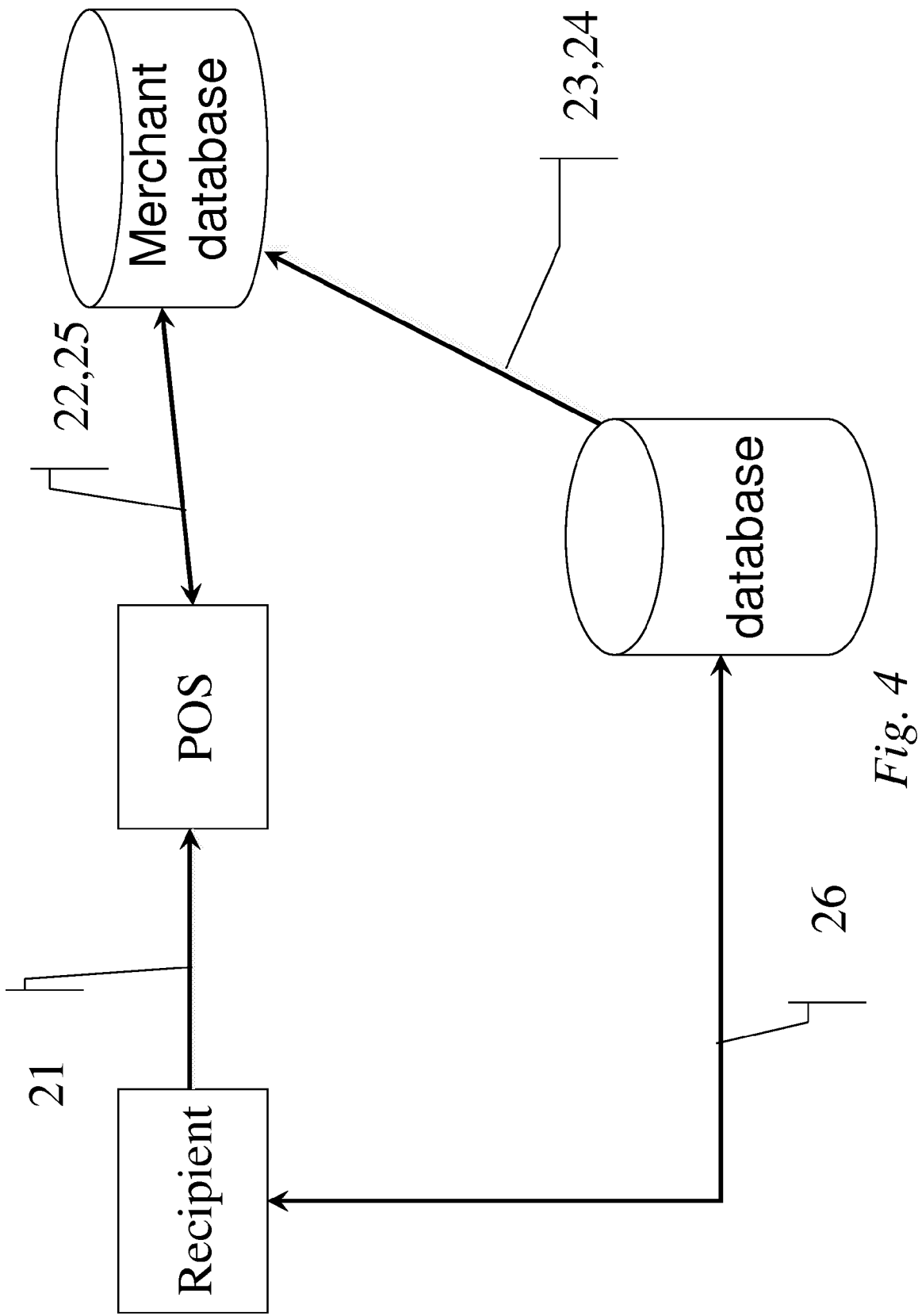
FIG. 4 illustrates a transaction flow of a typical redemption without the use of a clearinghouse in one embodiment of this invention.
Figure 5:
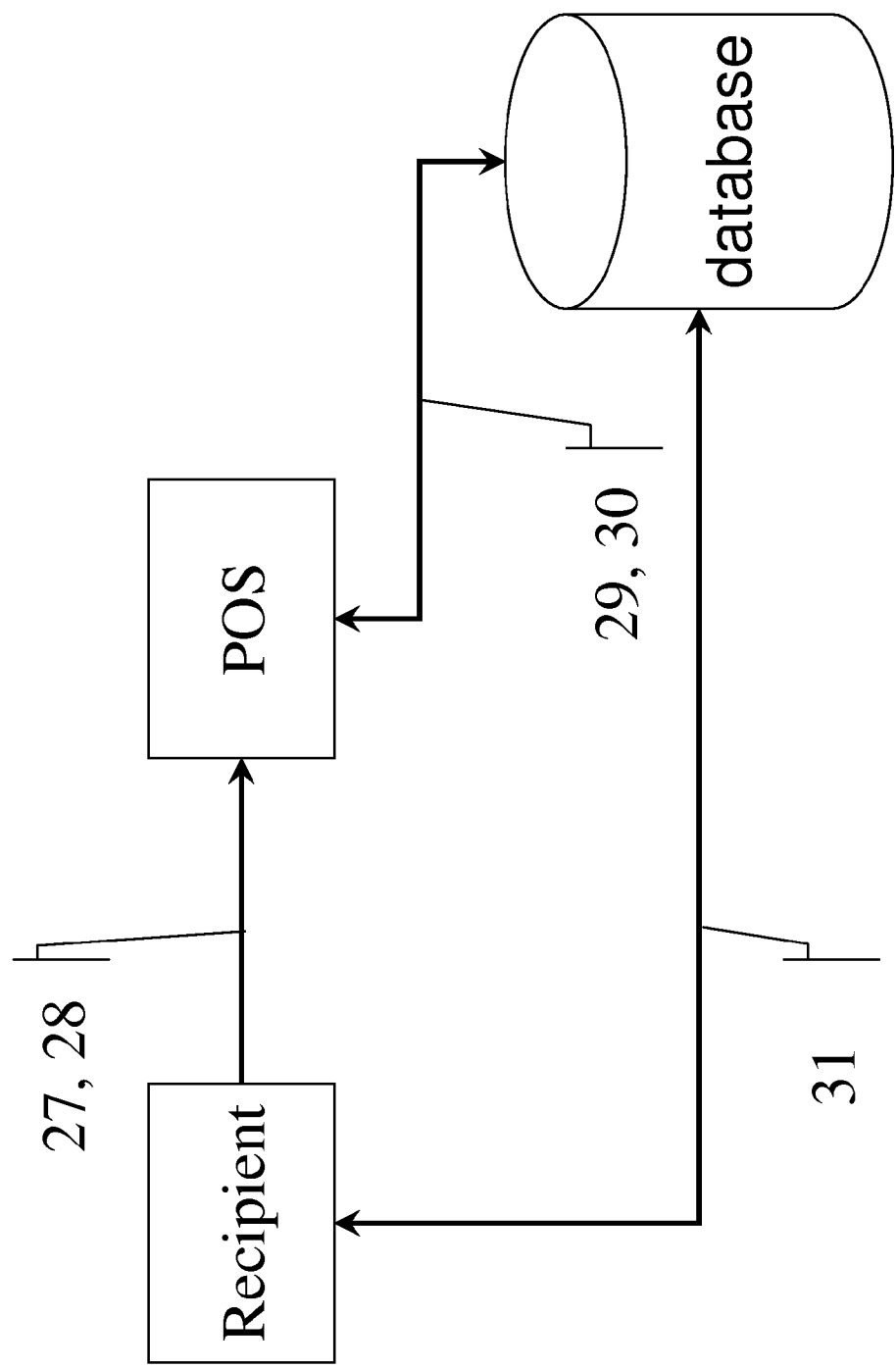
FIG. 5 illustrates a transaction flow of a typical redemption with a clearinghouse in one embodiment of this invention.
Figure 6:
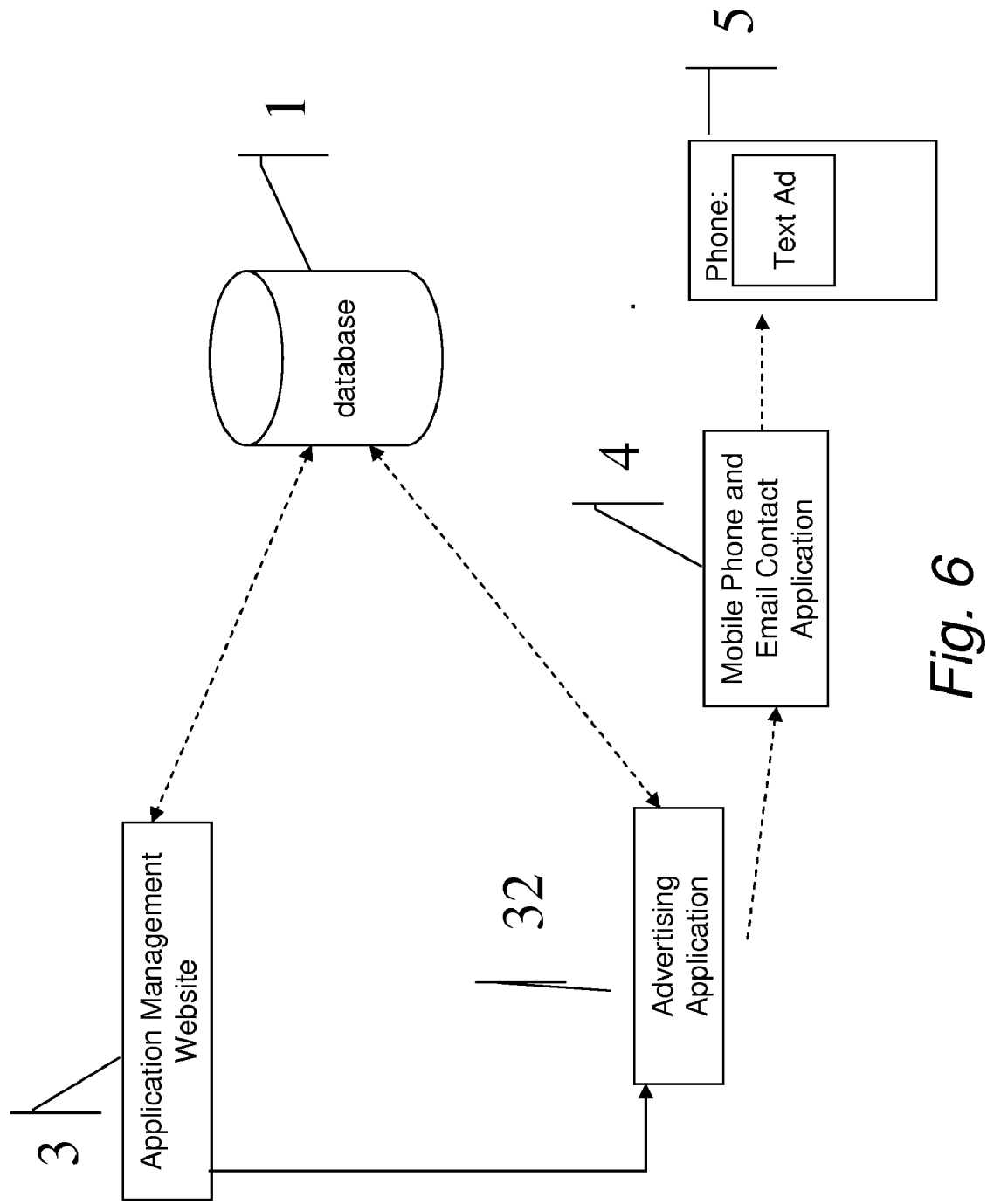
FIG. 6 is a flow diagram of a typical transaction wherein a retailer selects and schedules transmissions of advertising and the system transmits an advertisement to a recipient's mobile phone in one embodiment of this invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In this embodiment, users interact with the database using a graphical user interface (GUI) provided by a user interface. In a particular embodiment, GUI content may comprise HTML documents (i.e., web-pages) rendered on a client computer system using a web-browser. In such an embodiment, the server system may include a Hypertext Transfer Protocol (HTTP) server (i.e., a web server) configured to respond to HTTP requests from the client system and to transmit HTML documents to client system. The web-pages themselves may be static documents stored on the server system or generated dynamically using an application server interacting with HTTP server to service HTTP requests.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In the system in this embodiment, a point of sale and kiosk system may generally include a central processing unit (CPU) connected by a bus to memory and storage. Each point of sale and kiosk system is typically running an operating system configured to manage interaction between the computer hardware and the higher-level software applications running on the system connected to the database via a dedicated line or through the Internet. The server system may include hardware components similar to those used by the client system (e.g., a CPU, a memory, and a storage device, coupled by a bus). However, such a network environment is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, embodiments of the invention may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

Referring to the drawings, one embodiment of the invention would include a computer system for managing transactions for an image-based payment medium that would include a database 1, which keeps data related to the image-based payment medium and a recipient of the image-based payment medium; a web based user interface 2, for issuing and optionally authenticating the image-based payment medium and for sending an image representing the image-based payment medium to the recipient's mobile phone 5; and a point of sale system 7, to scan the image of the image-based payment medium from a screen of the recipient's mobile phone 5, interfacing with the database 1, to provide authentication of the image, and to provide debits and credits to the recipient's account. The image sent can be any unique graphics image or even a simple one or two dimensional barcode. The image can also be a single or multidimensional barcode embedded onto a photograph or graphics image. The photograph or graphics image can optionally be provided by the recipient. The Point of Sale system would use a webcam or barcode scanner 6, to scan the image from the screen on the recipient's mobile phone 5. Data stored in the database 1, for each recipient account includes information to uniquely identify the recipient and could include demographic data including the recipient's age, zip code and gender. The data may also include an indicator that the recipient has opted to receive advertisements on the mobile phone 5.

The database 1 and the database management system, would manage all information for transactions, account numbers, user preferences, etc. It would also manage all other applications necessary for verification of accounts, transactions, phone numbers, emails, etc., including the Mobile Phone and Email Contact application 4. An advertising Application 32, with a user interface through an application management website 3, could run reports on item performance, upload text message and email advertising, and allow the retailer to place orders to deliver advertising on specific dates and to specific opted-in population. Retailer's advertising order information would be sent to the database 1; then on a specified date and to a specified population, text and/or email advertising is sent out and targeted recipients get text and/or email advertising on the registered mobile phones 5.

Website, Kiosk or Point-of-Sale software 2, would collect data necessary to complete any transactions within the system, including data for purchase, activation, reloading, redeeming, and canceling.

For the purchasing transaction, the donor enters the recipient's name, personal message, recipient email, and recipient mobile phone number to trigger sending of the activation text and email notification to the recipient. This text directs the recipient to go to the Application Management Website 3, to activate the image-based payment medium. The recipient enters the mobile phone number to which the activation message was sent and the email address to be used for management and alerts. Optionally, the recipient enters opt-in for advertisements to be sent to the mobile phone 5. The recipient mobile phone 5 then receives an MMS (or other technology) message with an encoded image representing the account.

An Application Management Website 3, would allow system users to manage their accounts for their respective needs. Recipients would be able to check the balances of their accounts, view the transaction history, manipulate and customize graphics, resend items, and change account information. Retailers would be able to change their account details, and also input orders through the Advertising Application 32, to send out text message and/or email notices, attach coupons or loyalty plans to items used by consumers, or change logos and other graphic customization.

A Mobile Phone and Email Contact Application 4, would send out notices to system users, such as sales, coupon, or discount availability, as well as requested balance and account information. The information may be sent to the users' mobile phones 5, or email addresses. Also, the application could send out encoded image items that are linked to accounts for redemption, such as gift items.

The Mobile Phone 5, would be used by recipients or other system users to receive encoded image items, or notices, all sent by request from the database.

The Hardware Scanner 6, which may take the form of a handheld device or a webcam, would have the appropriate software to decode the encoded image items presented at the point of redemption, such as the point-of-sale for a retailer.

The Retailer POS and Transaction Routing Application 7, could include software that routes a transaction from the point of redemption, such as the point-of-sale, to the appropriate server that is designated to handle that transaction.

Another embodiment of this invention includes a method of providing an image-based payment medium comprising the steps of a) issuing an image-based payment medium through a website or other means, designating a recipient of the image-based payment medium and the recipient's mobile phone number and establishing an account for the recipient; b) optionally authenticating the recipient through a web based user interface, optionally gathering information from the recipient and sending an image to the recipient's mobile phone number where the image can be any unique graphic or could be a single or multi-dimensional barcode, perhaps embedded onto a photograph or graphics image; and c) scanning the image from the recipient's mobile phone at a point of sale with a barcode scanner or webcam to validate and either debit or credit the recipient's account for purchases made or returned by the recipient at the point of sale; d) sending advertisements to the recipient's mobile phone number, optionally only after the recipient agrees to accept these advertisements.

In step a) of this embodiment, the donor logs onto 8, a personal PC or a kiosk present at the store and registers 9, on the merchant's or third party provider's website. The donor then enters 10, the amount, Buyer's name, a personal text message, a personal voice message, phone number of recipient, email address of recipient, and/or delivery times. The donor then enters 11, the credit/debit card information for purchase of the image-based payment medium. A serial number is created for the newly purchased image-based payment medium and entered 12, in the database. The serial number is sent to the retailer or a clearinghouse. The serial number is used to create a corresponding code image according to stored standards for the retailer. An activation code is created for the transaction. The recipient is sent 13, an SMS message informing of the purchase of the image-based payment medium for the recipient and any message from the donor. The recipient is also sent an email informing of the purchase of the image-based payment medium. Optionally, the message instructs the recipient to go to a website to activate the card using an activation code included in the message sent to the recipient. The donor is sent 14, a message confirming completion of the transaction. In this embodiment, the donor and the recipient may be the same entity.

In step b) of this embodiment, the recipient logs onto 15, a personal PC or a kiosk present at a store and connects 16, to a website given in the message sent in step 14. The recipient is asked to enter 17, and email address and to participate in a demographic survey. The recipient is given the option to accept product specific advertising to be sent to the recipient's mobile phone 5, via SMS and/or email address. The recipient also enters the "activation code" found in SMS/email message to activate/confirm the recipient. Also, once confirmed, the recipient is asked to enter the phone number of the mobile phone 5, which will receive the image. The recipient survey data is sent 18, to the database. The encoded gift image is generated and sent 19, to the recipient's mobile phone number. Generation of the image is done by using a random number generator to create a unique alphanumeric string. This string is then converted into an alphanumeric barcode image. Optionally, any technique can be used to assign a unique account identifier and that identifier can then be converted into a multidimensional barcode. That barcode can be overlaid onto any picture or graphic provided by the recipient, the donor or the retailer. The result will be that the image will have small imperfections where it has been merged with the barcode, and these imperfections may even be indistinguishable to the naked human eye. However, a machine image scanner will be able to "see" these imperfections, and decode the barcode from the picture. Alternately, the barcode may be embedded into the picture itself, altering the image in some predetermined area of the picture, using the picture's inherent color, light, and shading scheme to create an alteration that can be scanned and decoded by a machine.

Also, a confirmation message is emailed to the recipient with instructions on how to reissue the images. A confirmation message is displayed 20, confirming activation of the image-based payment medium and transmission of the image to recipient's mobile phone 5.

In step c) of this embodiment, the recipient accesses 21 or 27, the encoded image on the mobile phone 5, at the retailer's point of sale. A scanner or webcam decodes the image into a code number for the image-based payment medium. The image-based payment medium code is reconciled 22, with the database for the credit amount to apply to the purchase. The purchase data is sent 23, to the database and the data is updated to a corresponding email tag along with the amount remaining in the account. This step can optionally be done via a batch transaction. The point of sale receives 25, the amount of the remaining on the account and the cashier reconciles the purchase with the recipient accordingly. Optionally, if update to the database is done in real-time rather than by batch, an SMS message showing 26, the remaining credit on the account can be sent to the recipient's mobile phone 5. Another embodiment combines the functionality of the different databases into one central or distributed database.

In step d) of this embodiment of the invention, the retailer will run reports through an advertising application 32, against the database 1, which will report on the image-based payment medium performance, allow the upload of text messages and email advertising and will allow the retailer to place orders to deliver advertising on specific dates and to specific recipients. The retailer's advertising order information is sent to the database and on the time and date specified by the retailer, text and/or email advertising is sent out to the specified recipients. The messages are then received by the recipient's mobile phone, or alternately, by the recipient's e-mail client.

A mobile phone as used in this specification is also known as a wireless phone, cell phone, or cellular telephone. It is a long-range, portable, electronic device used for mobile voice or data communication over a network of specialized base stations known as cell sites. In addition to the standard voice function of a mobile phone, mobile phones may support many additional services, and accessories, such as SMS for text messaging, email, packet switching for access to the Internet, gaming, Bluetooth, infrared, camera with video recorder and MMS for sending and receiving photos and video, MP3 player, radio and GPS. Most current mobile phones connect to a cellular network of base stations (cell sites), which is in turn interconnected to the public switched telephone network (PSTN) (the exception is satellite phones). In addition to cell sites, a mobile phone may also use other network accessing devices, such as "wi-fi", wireless Internet hotspots, voice over IP, and satellite to facilitate its services.

It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for providing an image-based payment medium comprising
    a server with means to connect to a database and a point of sale computer system comprising a computer and a scanner;
    said server configured to:
    generate and store in said database a record for a recipient comprising: a balance of an account, a unique image
    and a unique identifier for an associated mobile device and whether there is permission to send advertisements to said associated mobile device;
    establish a record for a retailer in said database comprising an advertisement;
    send said unique image to said associated mobile device;
    receive and validate said unique image received from said point of sale computer system, wherein the validation is based on determining whether a unique identifier associated with a mobile device that displayed the unique image at the point of sale is the unique identifier associated with the mobile device of the recipient;
    receive and process a transaction between said recipient and said retailer received from said point of sale system;
    send said advertisement to said associated mobile device for the recipient when there is permission and,
    update the record for the recipient with credits or debits to the balance of the account based on the transaction received and processed; and
    said point of sale computer system configured to:
    scan said unique image displayed on said associated mobile device;
    send said unique image to said server, and
    send said transaction to said server.

2. The apparatus of claim 1, wherein said unique image is a two dimensional barcode.

3. The apparatus of claim 1 wherein said point of sale system scanner is a barcode scanner.

* * * * *